US006857649B2

(12) United States Patent
Patton

(10) Patent No.: US 6,857,649 B2
(45) Date of Patent: Feb. 22, 2005

(54) SYSTEM AND METHOD FOR COSTUMING AND DECORATING A WHEELCHAIR

(76) Inventor: Prudence R. Patton, 3204 Princeton Ave., Philadelphia, PA (US) 19149

( * ) Notice: Subject to any disclaimer, the term of this patent is extended or adjusted under 35 U.S.C. 154(b) by 139 days.

(21) Appl. No.: 10/224,501

(22) Filed: Aug. 21, 2002

(65) Prior Publication Data

US 2004/0036254 A1 Feb. 26, 2004

(51) Int. Cl.[7] .................................................. B62M 1/04

(52) U.S. Cl. ................................ 280/250.1; 280/304.1; 297/219.1; 297/219.12; 297/228.1

(58) Field of Search ............................ 280/250.1, 304.1; 297/219.1, 219.12, 228.1, 283.1; D12/131, 133

(56) References Cited

U.S. PATENT DOCUMENTS 4,595,212 A * 6/1986 Haury et al. ............. 280/250.1
5,121,938 A * 6/1992 Gross et al. ............. 280/304.1
5,326,152 A * 7/1994 Baron ........................ 297/229
5,333,921 A * 8/1994 Dinsmoor, III .......... 297/219.1
5,549,313 A * 8/1996 James et al. ................ 280/221
5,707,107 A * 1/1998 Melone ................... 297/228.1
5,785,340 A * 7/1998 Dias ........................ 280/304.1
5,957,528 A * 9/1999 Campbell ................ 297/228.1
6,032,972 A * 3/2000 Dias ........................ 280/304.1

* cited by examiner

*Primary Examiner*—Lesley D. Morris
*Assistant Examiner*—L. Lum
(74) *Attorney, Agent, or Firm*—LaMorte & Associates

(57) ABSTRACT

The system includes a back panel that attaches to the backrest of the wheelchair. The back panel is ornamented and/or decorated in a selected motif. A top element and side panel elements are provided that attach to the back panel. The top element extends above the occupant of the wheelchair and the side elements protrude from the side of the wheelchair. Both the top element and the side elements are ornamented and/or decorated in the same motif, as is the back panel. Decorative wheel attachments are also provided. The decorative wheel attachments attach to at least two of the wheels of the wheelchair, wherein the decorative wheel attachments share the same ornamentation motif as do the other elements in the assembly.

18 Claims, 4 Drawing Sheets

SYSTEM AND METHOD FOR COSTUMING AND DECORATING A WHEELCHAIR

BACKGROUND OF THE INVENTION

1. Field of the Invention

In general, the present invention system and method relates to the costuming and/or decorating a wheelchair. More specifically the present invention system and method relate to a way of costuming and/or decorating a wheelchair by attaching decorative elements and other ornamentation to the structure of the wheelchair.

2. Prior Art Statement

Wheelchair bound people generally cannot go where they want and when they want without first making sure there are accommodations for their wheelchairs. This limitation in mobility makes many wheelchair bound people feel limited by their disability.

Society has been slow to accept wheelchair bound people because society must make changes to accommodate wheelchairs. Society also lacks the common experience needed to accept the medical equipment, bodily dysfunctions and disfigurements that accompany many wheelchair bound people. Many wheelchair bound people, therefore, feel different and isolated from many aspects of society Being wheelchair bound is particularly difficult for children. Wheelchair bound children cannot readily get out to run around with their friends. Furthermore, wheelchair bound children are much more likely to encounter ostracization and verbal abuse from their peers than are adults. Many of these children commonly feel different, isolated and inadequate to life's challenges. This leads to many psychological issues including poor self-esteem.

In order to avoid feelings of low self-esteem, isolation and other psychological issues, it is important for a wheelchair bound person to participate in as many activities as possible. Wheelchair bound children can especially benefit from positive early experiences by participating in as many activities as possible, both with their peers and with society at large. Of course, the reality of the wheelchair prevents the child from fully participating in many physical activities. However, a wheelchair often unnecessarily prevents many children from participating in many social and cultural events. For example, during Halloween and for costume parties, children often dress in costume. Costumes often have decorative clothing and accessories, such as headwear, swords, wands and the like that are carried by the children in costume. However, for a variety of reasons, many such costumes and accessories cannot be used by many children who are wheelchair bound. Many children who are wheelchair bound rest their heads against the back support of the wheelchair. This is especially true with younger children who are short or those requiring neck and head support. Contact with the backrest of the wheelchair prevents these children from wearing a hat or headpiece.

Furthermore, many children in wheelchairs need their arms to control the wheelchair, either directly or through electronic controls. Accordingly, many such children cannot carry accessories in their hands. Many wheelchair bound children also have specialized clothing that enables them to more readily use sanitary facilities or accommodate medical equipment. Many commercial costumes lack the proper structure and thus cannot be worn.

In an attempt to make costumes for people who are wheelchair bound, decorative shells have been produced that connect to the wheelchair. The shells may have the appearance of a fire truck, a police car or the like. In this manner, the wheelchair itself becomes the costume. Such prior art devices are exemplified by U.S. Pat. No. 5,785,340 to Dias, entitled Decorative Body Shell For Wheelchairs and U.S. Pat. No. 6,032,972 to Dias, entitled Decorative Body Shell For Wheelchairs. However, such costumes add significantly to the length, width and overall bulk of the wheelchair. Many, if not most, public and private facilities are barely accessible by a simple unadorned wheelchair. In such facilities, the use of costumes that significantly increase the size of the wheelchair are not practical.

Furthermore, the costume itself is large and bulky, thus it is hard to transport and store when not in use.

In the prior art, changeable slipcovers have also been designed for wheelchairs that enable the design of the seat and backrest support to be selectively changed. Such prior art is exemplified by U.S. Pat. No. 5,121,938 to Gross, entitled Slip Cover For Wheelchairs. One obvious disadvantage of decorating the seat and backrest support of a wheelchair is that these surfaces are almost completely covered by the person sitting in the wheelchair. Thus, even if these surfaces where highly decorated, these surfaces would not be highly visible. Another disadvantage of such slipcovers is that their presence interferes with many types of medical equipment that are commonly attached to the wheelchair.

A need therefore exists for c system and method of adorning a wheelchair that does not add to the bulk of the wheelchair, does not interfere with medical equipment and yet provides a highly visible costume or decoration to the wheelchair. This need is met by the present invention as described and claimed below.

SUMMARY OF THE INVENTION

The present invention is a system and method for costuming and/or decorating a wheelchair. The system includes a back panel that attaches to the backrest of the wheelchair. The back panel is ornamented and/or decorated in a selected motif. A top element and side panel elements are provided that attach to the back panel. The top element extends above the occupant of the wheelchair and the side elements protrude from the side of the wheelchair. Both the top element and the side elements are ornamented and/or decorated in the same motif, as is the back panel. Decorative wheel attachments are also provided. The decorative wheel attachments attach to at least two of the wheels of the wheelchair, wherein the decorative wheel attachments share the same ornamentation motif as do the other elements in the assembly.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
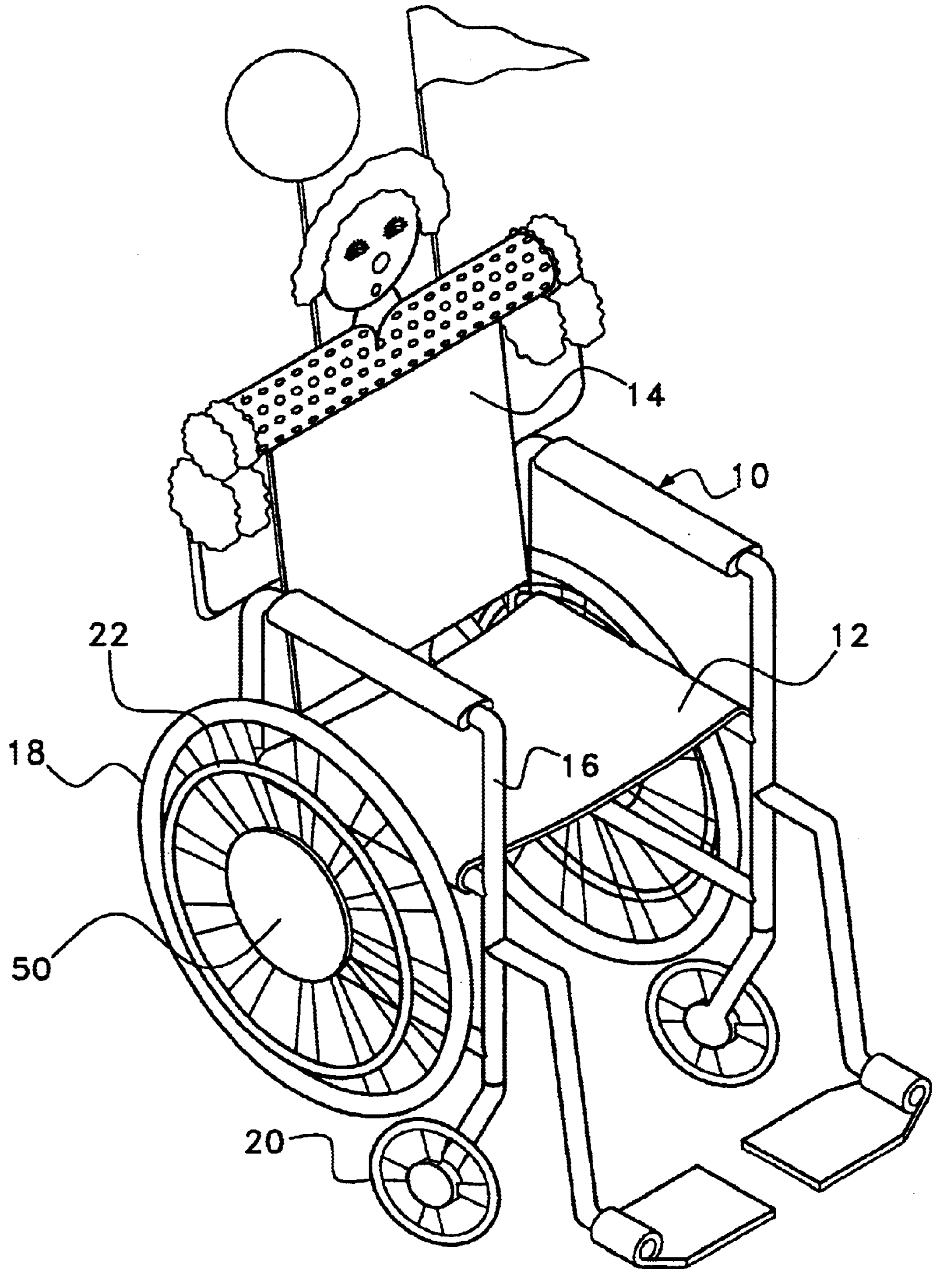
FIG. 1 is a perspective view of an exemplary embodiment of the present invention applied to a manual wheelchair.
Figure 2:
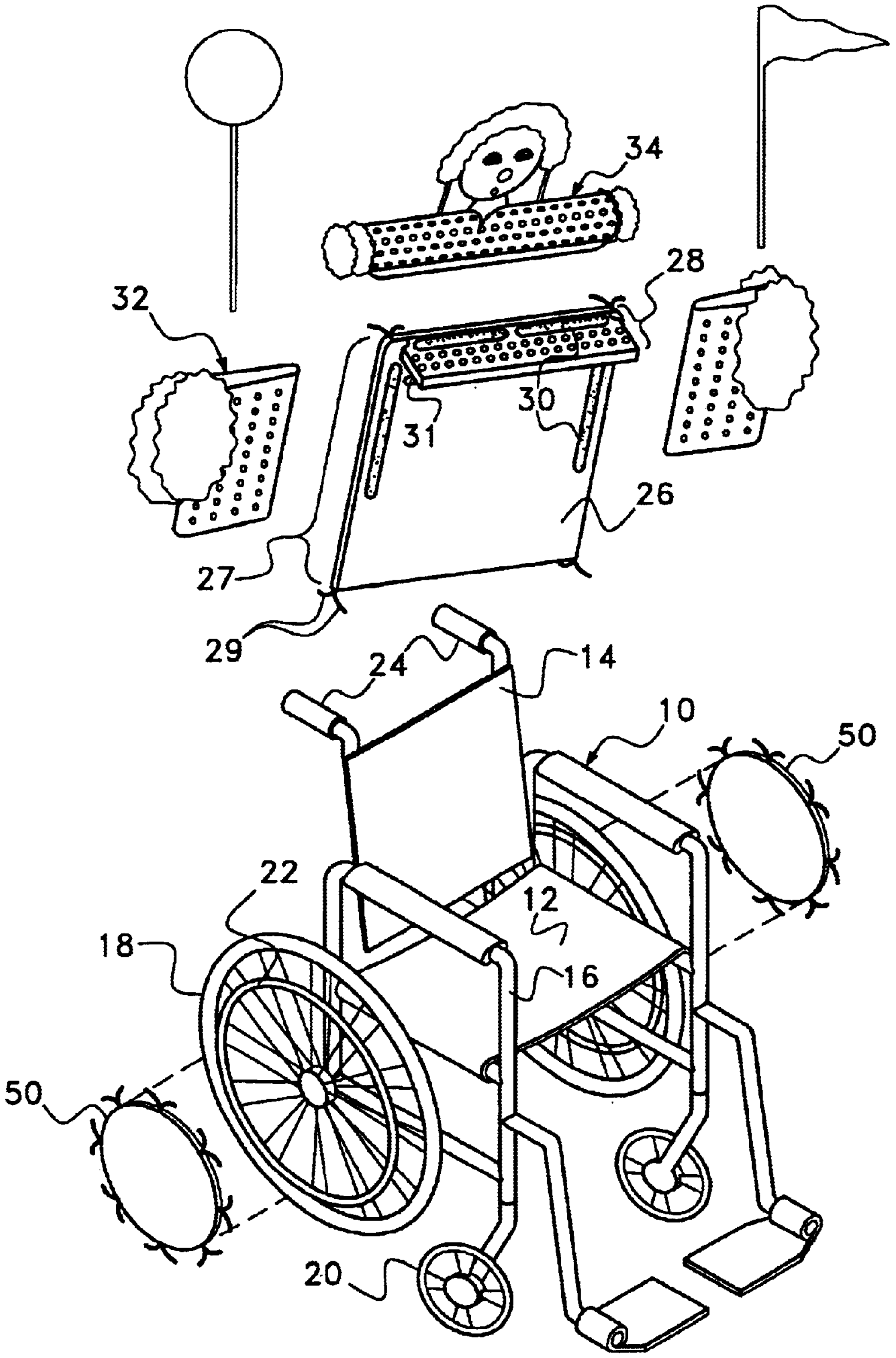
FIG. 2 is a perspective view of the embodiment of FIG. 1, shown fully assembled.

Referring to both FIG. 1 and FIG. 2, there is shown a typical modern wheelchair 10. The wheelchair 10 has a seat 12 and a backrest 14 that are supported by a frame 16. The wheelchair 10 has four wheels, which include two large rear wheels 18 and two small front wheels 20. The rear wheels 18 each have a rail 22 that enable a person sitting in the wheelchair 10 to grab and turn the rear wheels 18. In FIG. 1 and FIG. 2, a manual wheelchair 10 is illustrated as an exemplary embodiment of a wheelchair. The manual wheelchair 10 has two push handles 24 (FIG. 2) that extend from the wheelchair frame 16 behind the backrest 14. These handles 24 are used by non-occupants of the wheelchair 10 to move the wheelchair 10. Besides manual wheelchairs, there also exist many types of electric wheelchairs (not shown). Electric wheelchairs have an electric motor that turns the rear wheels of the wheelchair. The electric motor is controlled by the joystick controller that is positioned in the armrest of the wheelchair. Many electric wheelchairs do not have the illustrated rear handles 24.

In the shown exemplary embodiment of the present invention system, various elements are provided that are used to adorn a wheelchair 10. One of the primary elements of the present invention system is a back panel 26. The back panel 26 is best described by referring to FIG. 2. From FIG. 2, it can be seen that the back panel 26 has a first section 27 that extends down over the rear of the backrest 14 of the wheelchair 10. The back panel 26 also has a shorter second section 28 that folds over the top of the wheelchair backrest 14 and lays in the front of the backrest 14.

The back panel 26 is held in place by mechanical fasteners 29, such as tie strings that tie to the frame 16 of the wheelchair 10. If the back panel 26 is being attached to a manual wheelchair 10, slots 31 are formed in the material of the back panel 26. The slots 31 pass over the handles 24 of the wheelchair 10, thereby letting the back panel 26 lay flush against the rear of the wheelchair's backrest 14.

The back panel 26 can be a piece of decorative cloth, plastic, leather or any other material. The decoration contained on the back panel 26 can be any pattern, color and/or design and preferably has a costume theme. For example, if the in the occupant in the wheelchair 10 wants the wheelchair 10 to have a clown theme (as is shown), the back panel 26 can be polka dotted or have some other clown theme. If the occupant of the wheelchair 10 wants the wheelchair 10 to be decorated in a pirate theme, the back panel 26 can be adorned with pirate ships, jollyrogers and other pirate themed adornments.

Sections of hook and loop material 30 are present on the back panel 26. These sections of hook and loop material 30 are used to connect side elements 32 and a top element 34 to the back panel 26. The use of hook and loop material 30 is merely exemplary, and it should be understood that other connectors, such as snaps, buttons, or the like can be used in place of the hook and loop material 30.

Side elements 32 attach to the back panel 26 and extend outwardly from the sides of the back panel 26. On a wheelchair 10, the distance between the large rear drive wheels 18 is typically the widest part of the wheelchair 10. The seat 12 and the backrest 14 are typically much narrower, since these elements are supported between the large rear drive wheels 18. As such, there are areas on the sides of the seat 12 and above the rear wheels 18 that is not utilized. The side elements 32 are placed in these areas. The width of the side elements 32 is no longer than a few inches. Accordingly, when the side elements 32 are in place, the side elements 32 do not add significantly to the overall width or length of the wheelchair 10.

Hook and loop fastening material, snaps, buttons or other mechanical fasteners 46 are located on the sides of the side elements that enable the side elements to engage the back panel 26. The side elements 32 extend laterally from the back panel 26 into the unutilized space over the large rear wheels 18. The side elements 32 are decorated in the same motif as is the back panel 26 and may also contain complimentary accessories, such as flags, streamers, frill or the like.

When a person sits in the wheelchair 10, most all of the forward part of the backrest 14 is covered by the occupant of the wheelchair 10. However, the side elements 32 are not covered by the occupant of the wheelchair 10. As such, the side elements 32 become highly visible elements.

A top element 34 is also provided. The top element 34 extends upwardly from the top of the back panel 26. The top element 34 contains hook and loop fastening material, snaps, buttons or other mechanical fasteners 46 that enable the top element 34 to engage the back panel 26. The top element 34 extends upwardly from the back panel 26 into the unutilized space over the backrest 14 of the wheelchair 10. The top element 34 is decorated with in same motif as is the back panel 26 and the side elements 32. The top element 34 may also contain complimentary accessories, such as a face, a hat, flags, streamers, frill or the like.

When a person sits in the wheelchair 10, most all of the forward part of the backrest 14 is covered by the occupant of the wheelchair 10. However, the top element 34 extends over the head of the occupant and is not covered by the occupant of the wheelchair 10. As such, the top element 34 is highly visible.

Figure 3:
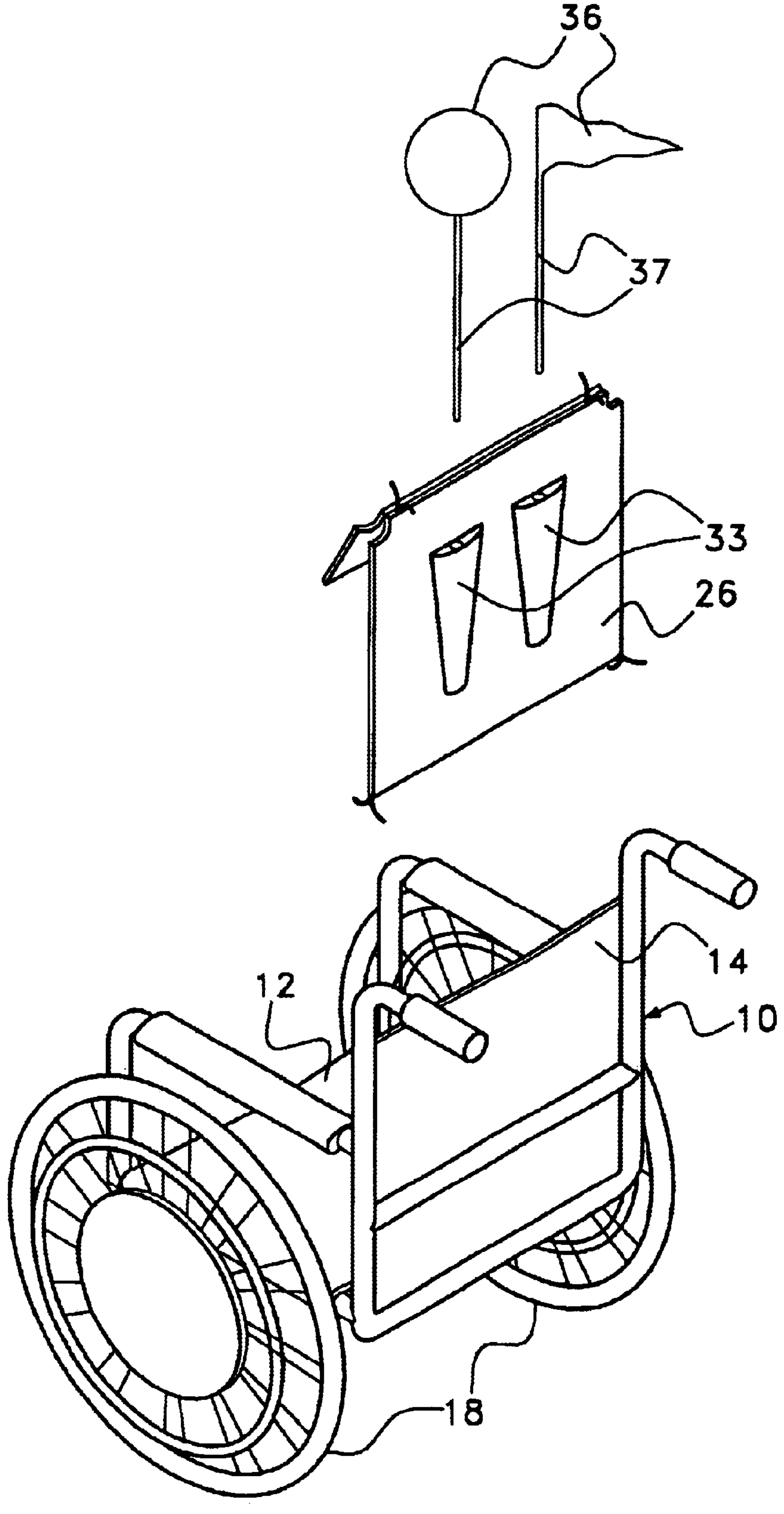
FIG. 3 is a rear perspective view of a manual wheelchair and back panel element of FIG. 1.

Referring now to FIG. 3, it can be seen that on the rearward surface of the back panel 26, pockets 33 are provided. The pockets 33 are designed to retain accessories 36 that complement the costume or decoration theme selected. For example, if the occupant of the wheelchair 10 wanted to decorate the wheelchair with in a clown motif, balloons or another clown accessories can be inserted into one of the rear pockets 33. Although the pockets 33 can be made to any dimensions, the pockets 33 are preferably made to hold the base of support sticks 37. The accessories 36 are then attached to the end of a support stick 37 so that the accessories 36 can be supported in a visible position above the head of the occupant of the wheelchair 10.

Returning to FIG. 2, it can be seen that to help adorn the wheelchair 10 from a side view, wheel attachments 50 are provided. The wheel attachments 50 are either cloth, plastic or paperboard elements that attach over the spokes of the large rear wheels 18 of the wheelchair 10. The wheel attachments 50 are decorated in the same motif, as is the back panel 26. Strings, hook and loop fastening material or other mechanical fasteners extend from the wheel attachments 50 and are used to connect the wheel attachments 50 to the spokes of the large rear wheels 18.

Figure 4:
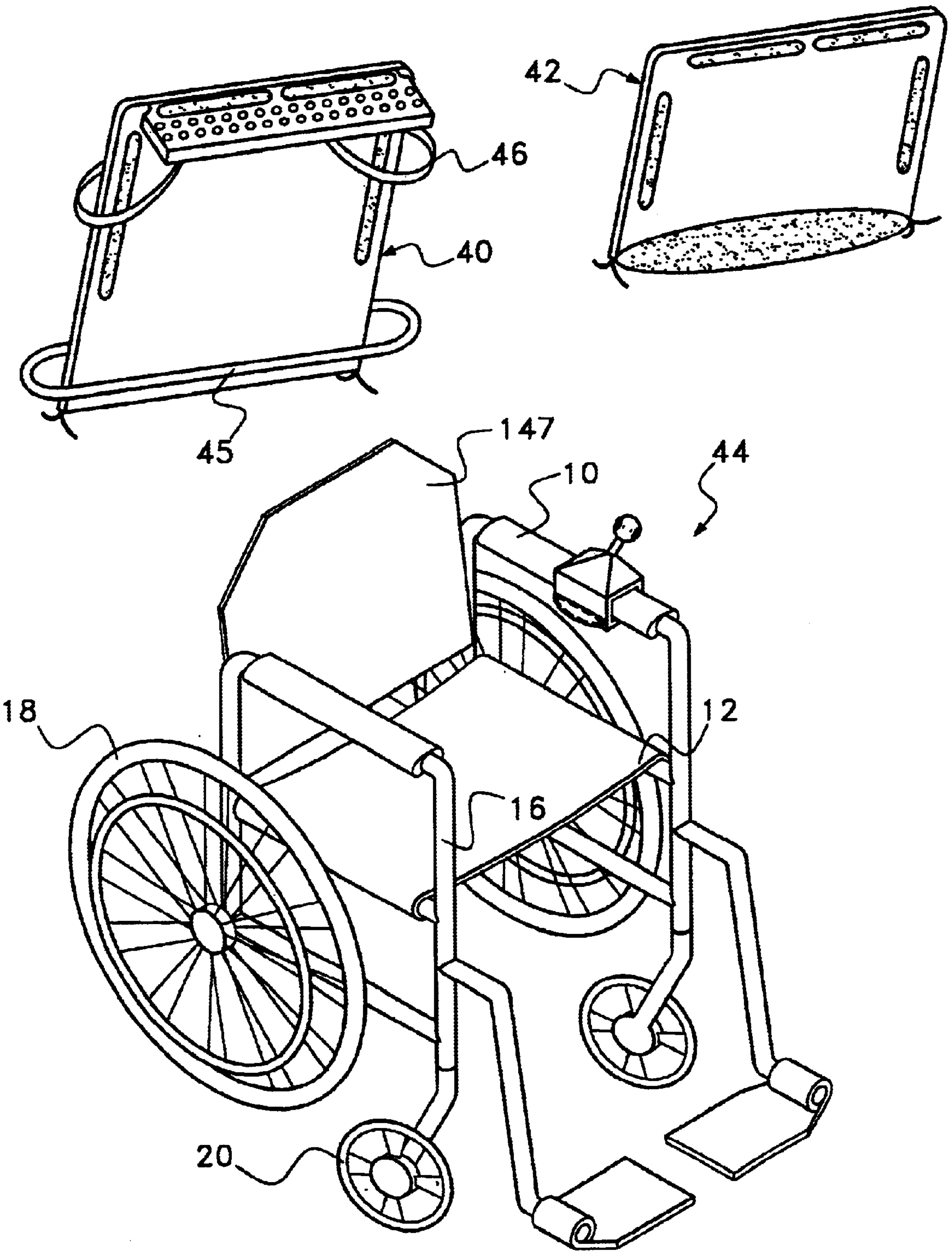
FIG. 4 is a perspective view of an electric wheelchair and FIGS. 4A and 4B two alternate embodiments of a back panel element in accordance with the present invention.

Referring lastly to FIGS. 4, 4A and 4B, alternate embodiments of the back panel element 40, 42 are shown. The shown embodiments are for electric wheelchairs 44 that do not have rear handles. In FIG. 4A, the first embodiment or the back panel 40, straps 45 are used to connect the back panel 40 to the wheelchair 44. One strap 45 passes around the bottom of the backrest 47 of the wheelchair 44. Two smaller straps 46 are used to engage the top corners of the backrest 47. The straps 45, 46 can be elastic or can be adjustable so as to fit a variety of different wheelchairs.

In FIG. 4B, the second embodiment of the back panel 42, a slipcover is provided. The back panel 42 is shaped like a pillowcase, having three closed sides and one open side. The open side is passed over the backrest 47 of the wheelchair 44. In this manner, the back panel 42 covers both the front and the rear of the wheelchair backrest 47.

The top element and side panel elements previously described in FIG. 2 can be attached to the back panel embodiments of FIGS. 4A and 4B in the same manner as was previously described.

It will be understood that, the embodiments of the present invention system and method described and illustrated are merely exemplary and a person skilled in the art can make many variations to the embodiments shown. All such alternate embodiments and modifications are intended to be included within the scope of the present invention as defined below in the claims.

What is claimed is:

1. A system for adorning a wheelchair having a seat, a backrest, and wheels, said system comprising:

a back panel that attaches to the backrest of the wheelchair, said back panel having a top edge and two side edges;

a top element, wherein said top element is selectively attachable to said top edge of said back panel; and wheel attachments that attach to at least two of the wheels of the wheelchair, wherein said back panel and wheel attachments share a common motif.

2. The system according to claim 1, further including two side elements, wherein said side elements are selectively attachable to said side edges of said back panel.

3. The system according to claim 2, further including fasteners for selectively attaching said side elements to said backrest cover.

4. The system according to claim 1, wherein said top element contains an adornment selected from a group consisting of hats, masks, faces, helmets and crowns.

5. The system according to claim 1, wherein the wheelchair has push handles and said back panel defines slots through which the push handles of the wheelchair pass.

6. The system according to claim 1, wherein said back panel contains at least one accessory support.

7. The system according to claim 6, further including at least one accessory that extends from said at least one accessory support.

8. The assembly according to claim 7, wherein said accessory is a decoration suspended from an elongated shaft and said at least one accessory support is sized to engage and retain an end portion of said elongated shaft.

9. A system for adorning a wheelchair having a seat, a backrest, and wheels, said system comprising:

a back panel that attaches to the backrest of the wheelchair;

side elements that extend laterally from said back panel on either side of the backrest; and a top element that extends from said back panel above the backrest;

wherein said back panel, said side elements and said top element share a common motif.

10. The system according to claim 9, further including wheel attachments that attach to at least two of the wheels of the wheelchair.

11. The system according to claim 9, wherein said side elements are selectively detachable from said back panel.

12. The system according to claim 9, wherein said top element is selectively detachable from said back panel.

13. The system according to claim 9, wherein said top element contains an adornment selected from a group consisting of hats, masks, faces, helmets and crowns.

14. The system according to claim 9, wherein said back panel contains at least one accessory support.

15. The system according to claim 14, further including at least one accessory that extends from said at least one accessory support.

16. A method of adorning a wheelchair having a seat, a backrest, and wheels, said method comprising the steps of:

providing a back panel having a predetermined motif;

providing wheel attachments decorated in said predetermined motif;

providing side elements;

attaching said back panel to said backrest of the wheelchair;

attaching said wheel attachments to at least some of the wheels of the wheelchair; and attaching said side elements to said back panel, wherein said back panel supports said side elements on either side of the backrest of the wheelchair.

17. The method according to claim 16, further including the steps of:

providing a top element; and attaching said top element to said back panel, wherein said back panel supports said top element above the backrest of the wheelchair.

18. The method according to claim 16, further including the step of attaching at least one accessory to said back panel, wherein said at least one accessory shares the same motif as said back panel.

* * * * *